United States Patent
Wei

(10) Patent No.: US 10,432,090 B2
(45) Date of Patent: *Oct. 1, 2019

(54) REFERENCE VOLTAGE GENERATOR WITH ADAPTIVE VOLTAGE AND POWER CIRCUIT

(71) Applicant: Audiowise Technology Inc., Hsinchu County (TW)

(72) Inventor: Lien-Sheng Wei, Hsin-Chu (TW)

(73) Assignee: AUDIOWISE TECHNOLOGY INC., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,956

(22) Filed: Dec. 3, 2018

(65) Prior Publication Data

US 2019/0103813 A1 Apr. 4, 2019

Related U.S. Application Data

(63) Continuation of application No. 15/662,530, filed on Jul. 28, 2017, now Pat. No. 10,193,444.

(51) Int. Cl.
| | |
|---|---|
| *H02M 3/157* | (2006.01) |
| *H02M 3/10* | (2006.01) |
| *G05F 1/613* | (2006.01) |
| *G05F 1/46* | (2006.01) |
| *G05F 3/24* | (2006.01) |
| *H02M 1/00* | (2006.01) |
| *H02M 3/156* | (2006.01) |
| *G05F 1/56* | (2006.01) |

(52) U.S. Cl.
CPC ............ *H02M 3/157* (2013.01); *G05F 1/463* (2013.01); *G05F 1/468* (2013.01); *G05F 1/613* (2013.01); *G05F 3/245* (2013.01); *H02M 3/10* (2013.01); *G05F 1/461* (2013.01); *G05F 1/56* (2013.01); *H02M 2001/0025* (2013.01); *H02M 2003/1566* (2013.01)

(58) Field of Classification Search
CPC . H02M 3/155–3/158; G05F 3/10; G05F 3/16; G05F 3/185; G05F 3/30
USPC .................................. 323/282–284, 311–313
See application file for complete search history.

(56) References Cited

U.S. PATENT DOCUMENTS

| | | | | |
|---|---|---|---|---|
| 6,313,662 | B1* | 11/2001 | Ide ................. | H03K 19/018528 326/30 |
| 7,589,507 | B2* | 9/2009 | Mandal ................... | G05F 1/575 323/270 |
| 10,193,444 | B1* | 1/2019 | Wei ....................... | H02M 3/157 |
| 2006/0170498 | A1* | 8/2006 | Portmann ........... | H03F 3/45192 330/255 |
| 2008/0174253 | A1* | 7/2008 | Noda ................. | H05B 33/0812 315/291 |

(Continued)

*Primary Examiner* — Adolf D Berhane
(74) *Attorney, Agent, or Firm* — WPAT, PC

(57) ABSTRACT

There is provided a reference voltage generator for providing an adaptive voltage. The reference voltage generator includes a steady current source and a PMOS transistor and an NMOS transistor cascaded to each other. A reference voltage provided by the reference voltage generator is determined by gate-source voltages of the PMOS transistor and the NMOS transistor. As said gate-source voltages vary with the temperature and manufacturing process, the reference voltage forms a self-adaptive voltage.

17 Claims, 3 Drawing Sheets

(56) References Cited

U.S. PATENT DOCUMENTS

| | | | |
|---|---|---|---|
| 2009/0051329 A1* | 2/2009 | Ashida | H02J 7/045 |
| | | | 320/164 |
| 2012/0154066 A1* | 6/2012 | Kubota | H03B 5/06 |
| | | | 331/116 FE |

* cited by examiner

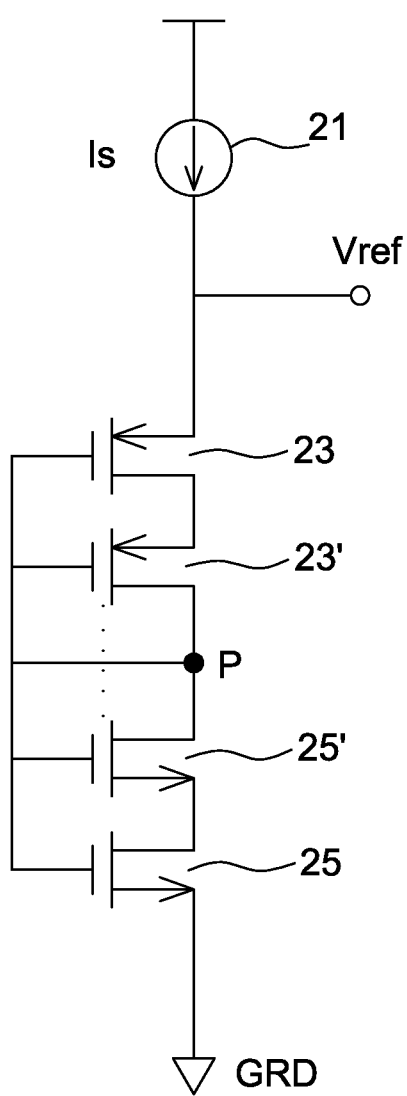
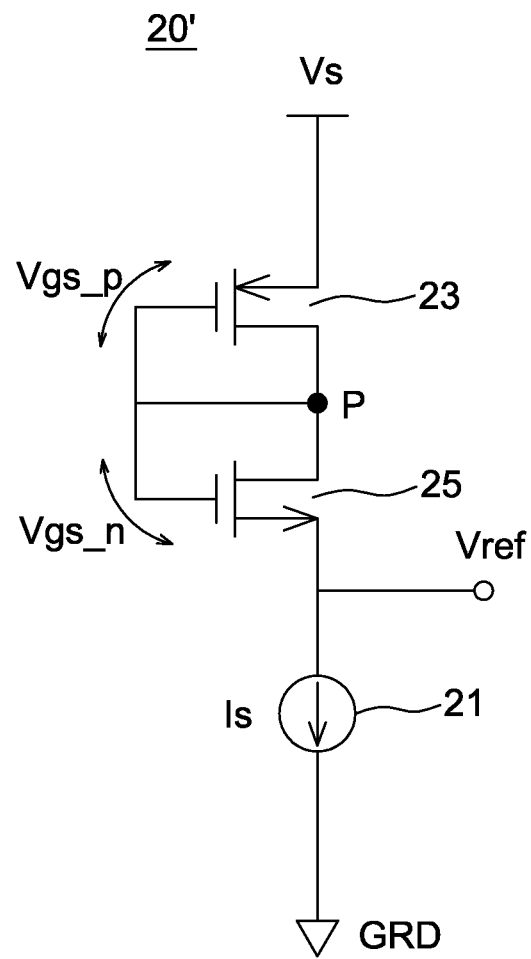
FIG. 3                    FIG. 4

REFERENCE VOLTAGE GENERATOR WITH ADAPTIVE VOLTAGE AND POWER CIRCUIT

RELATED APPLICATIONS

The present application is a continuation application of U.S. application Ser. No. 15/662,530, filed on Jul. 28, 2017, the disclosure of which is hereby incorporated by reference herein in its entirety.

BACKGROUND

1. Field of the Disclosure

This disclosure generally relates to a power circuit, more particularly, to a reference voltage generator with an adaptive voltage which automatically varies with the temperature and manufacturing process and an integrated circuit chip using the same.

2. Description of the Related Art

A bandgap reference circuit is generally used to provide a power source voltage required by the downstream circuits. The bandgap reference circuit includes a bandgap reference voltage source and a voltage regulator. The bandgap reference voltage source provides a stable reference voltage to the voltage regulator. The voltage regulator has a low Iddq to reduce the power consumption and is used to hold the power source voltage.

For example referring to FIG. 1, a bandgap reference circuit 10 provides a power source voltage Vdd to a divider 12. When the divider 12 is the one formed by D flip-flop circuits, although the divider 12 operates normally in a normal condition, the divider 12 may not be able to operate normally under extreme conditions at the SS corner and FF corner caused by manufacturing shift.

The conventional method to solve this issue is using a process and temperature detector to identify the chip's manufacturing process and temperature to accordingly calibrate the power source voltage Vdd. However, the desired operation temperature has to be known previously such that the power source voltage Vdd can be calibrated accurately.

Accordingly, it is required to provide a reference voltage generator having an adaptive voltage that is able to self-adjust the power source voltage Vdd without using the conventional calibration procedure.

SUMMARY

The present disclosure provides a reference voltage generator which provides an adaptive voltage and an integrated circuit chip using the same.

The present disclosure provides a reference voltage generator including a steady current source, a PMOS transistor and an NMOS transistor. The steady current source is configured to provide a steady current. A source electrode of the PMOS transistor is configured to receive the steady current. A drain electrode of the NMOS transistor is electrically connected to a drain electrode of the PMOS transistor at a node. A reference voltage provided by the reference voltage generator is outputted at the source electrode of the PMOS transistor. Gate electrodes of the PMOS transistor and the NMOS transistor are connected to the node such that the drain and gate electrodes of the PMOS transistor and the drain and gate electrodes of the NMOS transistor are connected together. At least one additional PMOS transistor or at least one additional NMOS transistor is further coupled between the drain electrodes of the NMOS transistor and the PMOS transistor.

The present disclosure further provides a reference voltage generator including a PMOS transistor, an NMOS transistor and a steady current. A drain electrode of the NMOS transistor is electrically connected to a drain electrode of the PMOS transistor at a node. The steady current source is configured to provide a steady current flowing out from a source electrode of the NMOS transistor. A reference voltage provided by the reference voltage generator is outputted at the source electrode of the NMOS transistor. Gate electrodes of the PMOS transistor and the NMOS transistor are connected to the node such that the drain and gate electrodes of the PMOS transistor and the drain and gate electrodes of the NMOS transistor are connected together. At least one additional PMOS transistor or at least one additional NMOS transistor is further coupled between the drain electrodes of the NMOS transistor and the PMOS transistor.

The present disclosure further provides a power circuit including a reference voltage generator and a regulator. The reference voltage generator includes a steady current source, at least one PMOS transistor and at least one NMOS transistor cascadely coupled to one another, wherein the at least one PMOS transistor has a first gate-source voltage, the at least one NMOS transistor has a second gate-source voltage, and the reference voltage generator is configured to provide a reference voltage which is determined by the first gate-source voltage and the second gate-source voltage. The regulator is configured to receive the reference voltage and generate an adaptive voltage that self-adjusts with temperature and manufacturing processes.

In the embodiment of the present disclosure, as the gate-source voltages of the PMOS transistor and the NMOS transistor can self-adjust with the manufacturing process and temperature, it is able to generate a reference voltage which automatically varies with the manufacturing process and temperature. In this way, the calibration mechanism is no longer required and the circuit failure under extreme conditions is solved using a simple circuit.

In some embodiments, if an adjustable range of the adaptive voltage is not able to cause the downstream circuit to leave the circuit failure, the steady current provided by the steady current source, a number of the coupled PMOS transistors and/or a number of the coupled NMOS transistors are adjusted to alter the voltage variation range of the adaptive voltage.

BRIEF DESCRIPTION OF THE DRAWINGS

Other objects, advantages, and novel features of the present disclosure will become more apparent from the following detailed description when taken in conjunction with the accompanying drawings.

FIG. 3 is a circuit diagram of a reference voltage generator according to one embodiment of the present disclosure.

FIG. 4 is a circuit diagram of a reference voltage generator according to another embodiment of the present disclosure.

DETAILED DESCRIPTION OF THE EMBODIMENT

It should be noted that, wherever possible, the same reference numbers will be used throughout the drawings to refer to the same or like parts.

The present disclosure is adaptable to a power circuit and a high-frequency circuit in an integrated circuit chip. The power circuit provides an adaptive voltage to the high-frequency circuit. As the MOS transistors in the high-frequency circuit and the power circuit are made in the same manufacturing process, they have substantially identical varying features with the temperature and manufacturing process. As the adaptive voltage provided by the power circuit self-adjusts with the temperature and manufacturing process, the circuit failure of the high-frequency circuit operating under extreme conditions is avoidable.

Figure 1:
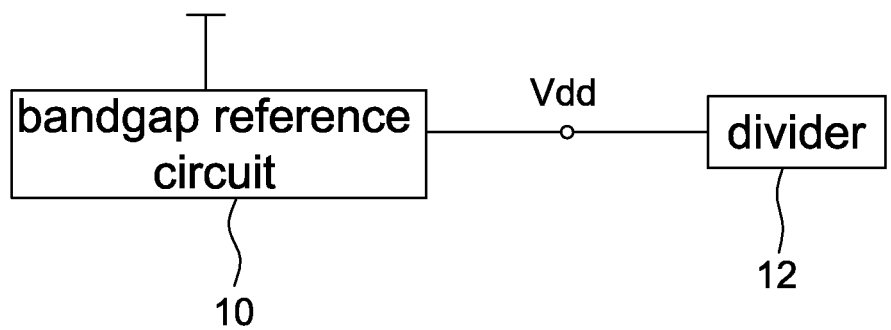
FIG. 1 is a block diagram of a conventional power circuit.
Figure 2:
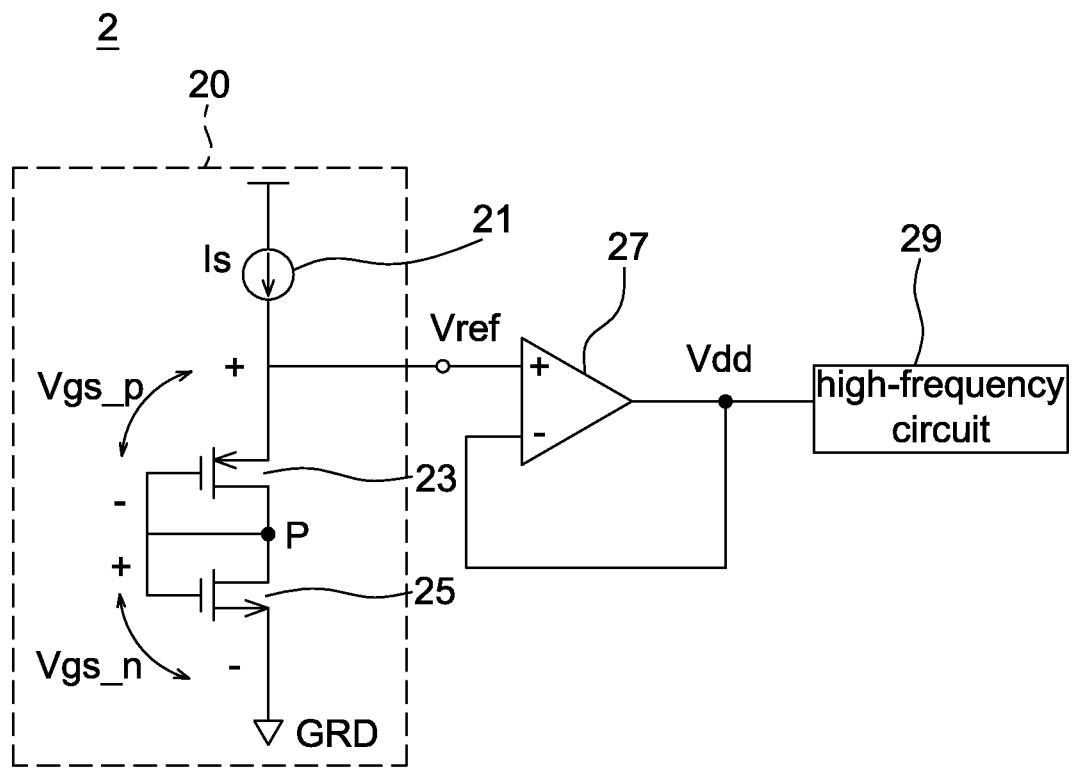
FIG. 2 is a power source and a high-frequency circuit in an integrated circuit chip according to one embodiment of the present disclosure.

Referring to FIG. 2, it is a power circuit and a high-frequency circuit 29 in an integrated circuit chip 2 according to one embodiment of the present disclosure, wherein the power circuit includes a reference voltage generator 20 and a regulator (LDO) 27. The reference voltage generator 20 is used to output a reference voltage Vref, and the regulator 27 receives the reference voltage Vref and generates a regulated voltage Vdd. The high-frequency circuit 29 takes the regulated voltage Vdd as the power source voltage, wherein the power source voltage is an adaptive voltage which automatically changes with the temperature and manufacturing process (described later).

In FIG. 2, the regulator 27 is shown as an operational amplifier used as a voltage follower. It should be mentioned that although FIG. 2 shows that the regulator 27 is a voltage follower having a voltage gain 1 and has its output terminal feedback to the negative input, it is only intended to illustrate but not to limit the present disclosure. In other embodiments, the regulator 27 has a voltage gain larger than 1 according to different applications, e.g., referring to U.S. patent application Ser. No. 15/499,497, filed on Apr. 27, 2017, assigned to the same assignee of the present disclosure, and the full disclosure of which is incorporated herein by reference.

The high-frequency circuit 29 generally fails under extreme conditions, but the high-frequency circuit 29 regains normal operation by adjusting the regulated voltage Vdd. In one embodiment, the high-frequency circuit 29 is a divider formed by D flip-flop circuits.

For example, if the divider fails under the extreme condition of 8 GHZ, SS corner and −40° C., the normal operation is regained by increasing the regulated voltage Vdd. For example, if the divider fails under the extreme condition of 4 GHZ, FF corner and 85° C., the normal operation is regained by decreasing the regulated voltage Vdd. It should be mentioned that the values, e.g., the frequencies and temperatures, of said extreme conditions herein are only intended to illustrate but not to limit the present disclosure.

The reference voltage generator 20 includes a steady current source 21, at least one PMOS transistor and at least one NMOS transistor cascaded to one another, e.g., FIG. 2 showing one PMOS transistor 23 cascaded with an NMOS transistor 25. The at least one PMOS transistor 23 has a first gate-source voltage Vgs_p, the at least one NMOS transistor 25 has a second gate-source voltage Vgs_n, and the reference voltage generator 20 is used to provide a reference voltage Vref which is determined by the first gate-source voltage Vgs_p and the second gate-source voltage Vgs_n.

For example in FIG. 2, the steady current source 21 is used to provide a steady current Is, and said steady current source 21 is provided, for example, by a bandgap reference voltage source or other circuits without particular limitations.

In the embodiment of FIG. 2, a source electrode of the PMOS transistor 23 is coupled to the steady current source 21 to receive the steady current Is, and the PMOS transistor 23 has a first gate-source voltage Vgs_p. A drain electrode of the NMOS transistor 25 is electrically coupled to a drain electrode of the PMOS transistor 23, and the NMOS transistor 25 has a second gate-source voltage Vgs_n, wherein the first gate-source voltage Vgs_p and the second gate-source voltage Vgs_n are represented by equation (1):

$$V_{GS}=V_{TH}+((2I_D/\mu C_{OX})\times(L/W))^{1/2} \qquad \text{equation (1)},$$

wherein, $V_{TH}$ is a threshold voltage of the MOS transistor related to the manufacturing process and temperature; $I_D$ is drain current; $\mu$ is electron mobility which is a constant related to the manufacturing process; $C_{OX}$ is a oxide capacitance of the oxide layer between the gate electrode and the substrate; and (L/W) is the length-width ratio.

The reference voltage Vref provided by the reference voltage generator 20 is determined by the first gate-source voltage Vgs_p and the second gate-source voltage Vgs_n. For example, if a source electrode of the NMOS transistor 25 of the reference voltage generator 20 is coupled to a ground voltage GRD, the reference voltage Vref=Vgs_p+ Vgs_n. In some embodiments, the source electrode of the NMOS transistor 25 is connected to a constant voltage source.

Accordingly, after $I_D$, L and W are determined according to the operation voltage of the high-frequency circuit 29, the gate-source voltage $V_{GS}$ is still related to the temperature and manufacturing process. For example, with respect to a normal condition for the TT corner and normal temperature, under the extreme condition for the FF corner and high temperature, $V_{TH}$ and $V_{GS}$ becomes smaller and thus the high-frequency circuit 29 regains to operate normally due to the reduced regulated voltage Vdd. For example, with respect to the normal condition for the TT corner and normal temperature, under the extreme condition for the SS corner and low temperature, $V_{TH}$ and $V_{GS}$ becomes larger and thus the high-frequency circuit 29 regains to operate normally due to the increased regulated voltage Vdd. Accordingly, even though the operation feature of the integrated circuit chip 2 changes with the manufacturing process and temperature, the power source voltage (i.e. Vdd) self-adjusts to cause the high-frequency circuit 45 to operate normally under extreme conditions.

FIG. 2 shows that the drain electrode of the NMOS transistor 25 is electrically coupled to the drain electrode of the PMOS transistor 23 directly, and gate electrodes of the PMOS transistor 23 and the NMOS transistor 25 are electrically coupled to a node P between the drain electrodes of the PMOS transistor 23 and the NMOS transistor 25.

In some embodiments, according to a value of the reference voltage Vref to be provided by the reference voltage generator 20 and the operation range of the gate-source voltages $V_{GS}$ of the MOS transistors (e.g., 23 and 25), at least one another NMOS transistor and/or at least one another PMOS transistor is further connected between the drains of the NOMS transistor 25 and the PMOS transistor 23 as long as the steady current source 21 provides a steady current Is flowing into the source electrode of a first PMOS transistor among the at least one PMOS transistor.

For example, FIG. 3 is a circuit diagram of a reference voltage generator according to one embodiment of the present disclosure, wherein the connection in FIG. 3 between the reference voltage generator and the regulator 27 as well as the high-frequency circuit 29 connected downstream is similar to that shown in FIG. 2 and thus details thereof are not repeated herein. That is, the regulator 27 is connected to a node between the steady current source 21 and the at least one PMOS transistor so as to receive the reference voltage Vref and generate the regulated voltage Vdd.

In FIG. 3, at least one another PMOS transistor and at least one another NMOS transistor are further connected between drain electrodes of the NMOS transistor 25 and the PMOS transistor 23, e.g., the drain electrode of the PMOS transistor 23 being electrically coupled with the source electrode of the PMOS transistor 23' to form a cascaded connection, the drain electrode of the NMOS transistor 25 being electrically coupled with the source electrode of the NMOS transistor 25' to form a cascaded connection, gate electrodes of the PMOS transistor 23, PMOS transistor 23', NMOS transistor 25 and NMOS transistor 25' are all connected to the node P.

In some embodiments, a plurality of other PMOS transistors 23' and a plurality of other NMOS transistors 25' are further connected between the drain electrodes of the NMOS transistor 25 and the PMOS transistor 23, and the connection thereof is to electrically couple the drain electrode of a previous PMOS transistor to the source electrode of a next PMOS transistor, and to electrically couple the source electrode of a previous NMOS transistor to the drain electrode of a next NMOS transistor to form a cascaded connection.

In some embodiments, a number of the coupled other PMOS transistors 23' and the coupled other NMOS transistors 25' is adjustable. The way of adjusting the number is to, for example, connect or bypass the plurality of other PMOS transistors 23' using switching devices, or to, for example, connect or bypass the plurality of other NMOS transistors 25' using switching devices. In another embodiment, a plurality of transistor banks, among which one transistor bank is formed by connecting a number of cascaded NMOS transistors and PMOS transistors (as shown in FIG. 3) different from a number of cascaded NMOS transistors and PMOS transistors of another transistor bank, are arranged. The purpose of connecting different numbers of MOS transistors is achieved by connecting different transistor banks using the multiplexer or switching devices. For example, the transistors 23, 25 of FIG. 2 and the transistors 23, 23', 25, 25' of FIG. 3 are all arranged in the integrated circuit chip 2 as different transistor banks. When the regulator 27 is connected as FIG. 2, the gate-source voltage $V_{GS}$ is indicated as equation (1), while when the regulator 27 is connected as FIG. 3, the gate-source voltage $V_{GS}$ is indicated as equation (2), assuming transistors 23 and 23' being identical and transistors 25 and 25' being identical, $$V_{GS}=V_{TH}+((2I_D/\mu\ C_{OX})\times(2L/W))^{1/2} \quad \text{equation (2).}$$

It should be mentioned that the way of changing the regulated voltage Vdd by changing the coupled transistor bank is implemented by using the processing unit such as a CPU or a MCU to change the connection, and it is different from the self-adjustment of the regulated voltage Vdd by the NMOS transistor 25 and the PMOS transistor 23 due to the variation of the temperature and manufacturing process. As mentioned above, after $I_D$, L and W are determined, the regulated voltage Vdd provided to the high-frequency circuit 29 is determined. The arrangement of the NMOS transistor 25 and the PMOS transistor 23 is to regain the high-frequency circuit 29 to the normal operation under extreme conditions. In some conditions, if the variation of the gate-source voltages $V_{GS}$ of the PMOS transistor 23 and the NMOS transistor 25 is not able to regain the high-frequency circuit 29 to the normal operation, changing the coupled transistors is then considered. Generally, if the design is properly done, the high-frequency circuit 29 is regained to the normal operation only due to the adaptive changing of the gate-source voltages $V_{GS}$ of the MOS transistors.

Another way of changing the regulated voltage Vdd is to adjust a value of the steady current Is provided by the steady current source 21. It is implemented by disposing a changeable steady current source or disposing multiple different constant current sources without particular limitations as long as the value of the steady current Is of the reference voltage generator 20 is changeable. As mentioned above, if the design is made properly, the steady current source 21 only provides a constant current, and the high-frequency circuit 29 is regained to the normal operation only due to the adaptive changing of the gate-source voltages $V_{GS}$ of the MOS transistors. The value of the steady current Is is changed only when the adaptive changing of the gate-source voltages $V_{GS}$ of the MOS transistors is not able to move the high-frequency circuit 29 back to the normal operation.

It is able to use the above changing the connection of MOS transistors and adjusting the steady current Is together.

Referring to FIG. 4, it is a circuit diagram of the reference voltage generator according to another embodiment of the present disclosure. The difference between the reference voltage generator 20' of FIG. 4 and the reference voltage generator 20 of FIG. 2 is mainly on the disposed position of the steady current source 21 and the connected position of the regulator 27. For example, FIG. 4 shows that the regulator 27 is connected to a node between the source electrode of the NMOS transistor 25 and the ground voltage GRD.

In this embodiment, the source electrode of the PMOS transistor 23 is coupled to a constant voltage Vs, and the PMOS transistor 23 has a first gate-source voltage Vgs_p; the drain electrode of the NMOS transistor 25 is electrically coupled to the drain electrode of the PMOS transistor 23, and the NMOS transistor 25 has a second gate-source voltage Vgs_n; and the steady current source 21 is electrically coupled to the source electrode of the NMOS transistor 25 to provide a steady current Is flowing out from the source electrode of the NMOS transistor 25. Similarly, the reference voltage Vref provided by the reference voltage source 20 is determined by the first gate-source voltage Vgs_p and the second gate-source voltage Vgs_n, e.g., Vref=Vs−(Vgs_p+Vgs_n).

In FIG. 4, the drain electrode of the NMOS transistor 25 is electrically coupled to the drain electrode of the PMOS transistor 23 directly, and gate electrodes of the PMOS transistor 23 and the NMOS transistor 25 are electrically coupled to a node P between the drain electrodes of the NMOS transistor 25 and the PMOS transistor 23.

As mentioned above, according to values of the operating voltage required by the high-frequency circuit 29 and the operation range of the gate-source voltage $V_{GS}$ of the MOS transistors, at least one another NMOS transistor and/or at least one another PMOS transistor is further connected between the drains of the NOMS transistor 25 and the PMOS transistor 23 as long as the steady current source 21 provides a steady current Is flowing out from the source electrode of a last NMOS transistor among the at least one NMOS transistor.

Referring to FIG. 5 for example, one another PMOS transistor 23' and one another NMOS transistor 25' are further connected between the drain electrodes of the NMOS transistor 25 and the PMOS transistor 23 to form a cascaded connection, and the connecting method thereof has been illustrated above and shown in FIG. 5 and thus details thereof are not repeated herein.

Similarly, in some embodiments a plurality of other PMOS transistors 23' and a plurality of other NMOS transistors 25' are further connected between the drain electrodes of the NMOS transistor 25 and the PMOS transistor 23 to form a cascaded connection, and a number of the connected other PMOS transistors 23' and other NMOS transistors 25' is adjustable. The connecting and adjusting methods thereof have been illustrated above and thus details thereof are not repeated herein.

Similarly, in some embodiments, a value of the steady current Is provided by the steady current source 21 is adjustable, and the adjusting method thereof has been illustrated above and thus details thereof are not repeated herein.

Figure 5:
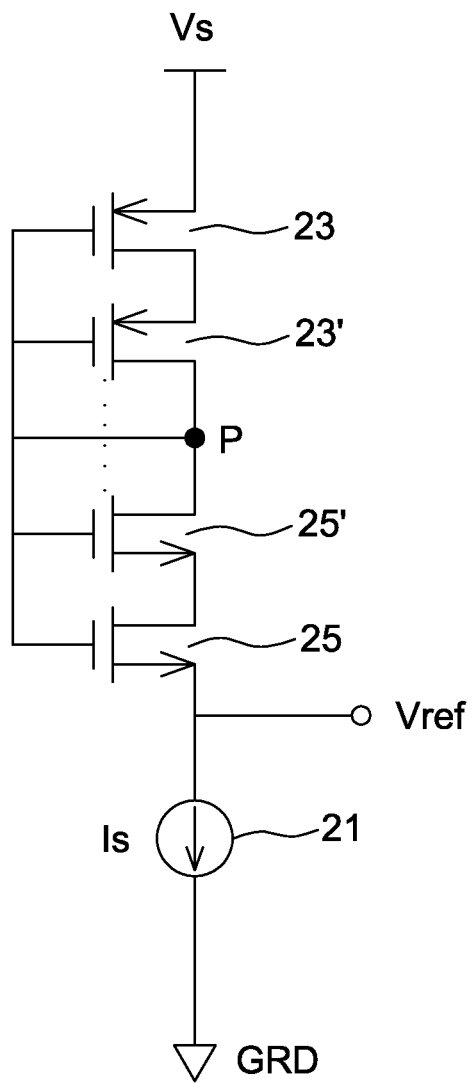
FIG. 5 is a circuit diagram of a reference voltage generator according to an alternative embodiment of the present disclosure.

It should be mentioned that although numbers of the PMOS transistors and the NMOS transistors shown in FIGS. 3 and 5 are arranged symmetrically, the present disclosure is not limited thereto. In some embodiments, a number of the connected PMOS transistors is different from a number of the connected NMOS transistors in the reference voltage generator 20.

In the present disclosure, a value of the constant voltage Vs does not have particular limitations, e.g., in the 55 nm and 40 nm CMOS integrated circuit manufacturing process, the constant voltage Vs being selected from 1.1-1.8 volts. However, the constant voltage Vs is selected from other values in other manufacturing process without particular limitations.

The definitions of the SS corner, FF corner and TT corner are well known to the art, and thus details thereof are not described herein.

It is appreciated that the integrated circuit chip 2 of the present disclosure includes other circuits in addition to the above power circuit and high-frequency circuit. The type and function of said other circuits are determined according to the purpose and usage of the integrated circuit chip 2.

As mentioned above, the conventional power source circuit has to use the calibration mechanism to recover some downstream circuits from the failure, and the calibration mechanism has to use the process and temperature detector to perform the detection such that a complicated procedure is required. Therefore, the present disclosure further provides a reference voltage generator (FIGS. 2 to 5) and an integrated circuit chip using the same (FIG. 2) that provides an adaptive power voltage by arranging a simple circuit to allow the downstream circuit to function normally under extreme conditions. The present disclosure has the effects of having a simple circuit and increasing the operable range of the circuit.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A reference voltage generator, comprising:
   a steady current source configured to provide a steady current;
   a PMOS transistor, a source electrode of the PMOS transistor being configured to receive the steady current; and
   an NMOS transistor, a drain electrode of the NMOS transistor being electrically connected to a drain electrode of the PMOS transistor at a node,
   wherein a reference voltage provided by the reference voltage generator is outputted at the source electrode of the PMOS transistor,
   gate electrodes of the PMOS transistor and the NMOS transistor are connected to the node such that the drain and gate electrodes of the PMOS transistor and the drain and gate electrodes of the NMOS transistor are connected together, and
   at least one additional PMOS transistor or at least one additional NMOS transistor is further coupled between the drain electrodes of the NMOS transistor and the PMOS transistor.

2. The reference voltage generator as claimed in claim 1, wherein the steady current provided by the steady current source is adjustable.

3. The reference voltage generator as claimed in claim 1, wherein the steady current source is provided by a bandgap reference voltage source.

4. The reference voltage generator as claimed in claim 1, wherein a source electrode of the NMOS transistor is coupled to a ground voltage or a constant voltage.

5. The reference voltage generator as claimed in claim 1, wherein a plurality of other PMOS transistors or a plurality of other NMOS transistors are further coupled between the drain electrodes of the NMOS transistor and the PMOS transistor, and a number of the coupled other PMOS transistors and other NMOS transistors are adjustable.

6. A reference voltage generator, comprising:
   a PMOS transistor;
   an NMOS transistor, a drain electrode of the NMOS transistor being electrically connected to a drain electrode of the PMOS transistor at a node; and
   a steady current source configured to provide a steady current flowing out from a source electrode of the NMOS transistor,
   wherein a reference voltage provided by the reference voltage generator is outputted at the source electrode of the NMOS transistor,
   gate electrodes of the PMOS transistor and the NMOS transistor are connected to the node such that the drain and gate electrodes of the PMOS transistor and the drain and gate electrodes of the NMOS transistor are connected together, and
   at least one additional PMOS transistor or at least one additional NMOS transistor is further coupled between the drain electrodes of the NMOS transistor and the PMOS transistor.

7. The reference voltage generator as claimed in claim 6, wherein the steady current provided by the steady current source is adjustable.

8. The reference voltage generator as claimed in claim 6, wherein the steady current source is provided by a bandgap reference voltage source.

9. The reference voltage generator as claimed in claim 6, wherein a source electrode of the PMOS transistor is coupled to a constant voltage.

10. The reference voltage generator as claimed in claim 6, wherein a plurality of other PMOS transistors or a plurality of other NMOS transistors are further coupled between the drain electrodes of the NMOS transistor and the PMOS transistor, and a number of the coupled other PMOS transistors and other NMOS transistors are adjustable.

11. A power circuit, comprising:
- a reference voltage generator comprising a steady current source, at least one PMOS transistor and at least one NMOS transistor cascadely coupled to one another, wherein the at least one PMOS transistor has a first gate-source voltage, the at least one NMOS transistor has a second gate-source voltage, and the reference voltage generator is configured to provide a reference voltage which is determined by the first gate-source voltage and the second gate-source voltage; and
- a regulator configured to receive the reference voltage and generate an adaptive voltage that self-adjusts with temperature and manufacturing processes.

12. The power circuit as claimed in claim 11, wherein the steady current source is configured to provide a steady current flowing into a source electrode of the at least one PMOS transistor.

13. The power circuit as claimed in claim 11, wherein the steady current source is configured to provide a steady current flowing out from a source electrode of the at least one NMOS transistor.

14. The power circuit as claimed in claim 11, wherein the steady current provided by the steady current source is adjustable.

15. The power circuit as claimed in claim 11, wherein the reference voltage generator comprises the steady current source, a plurality of PMOS transistors and a plurality of NMOS transistors cascadely coupled to one another, and a number of the coupled PMOS transistors and the NMOS transistors are adjustable.

16. The power circuit as claimed in claim 11, wherein the regulator is an operational amplifier.

17. The power circuit as claimed in claim 11, wherein the steady current source is provided by a bandgap reference voltage source.

* * * * *